(12) United States Patent
Tek

(10) Patent No.: US 7,327,880 B2
(45) Date of Patent: Feb. 5, 2008

(54) LOCAL WATERSHED OPERATORS FOR IMAGE SEGMENTATION

(75) Inventor: Huseyin Tek, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 373 days.

(21) Appl. No.: 10/951,194

(22) Filed: Sep. 27, 2004

(65) Prior Publication Data

US 2005/0201618 A1 Sep. 15, 2005

Related U.S. Application Data

(60) Provisional application No. 60/552,482, filed on Mar. 12, 2004.

(51) Int. Cl.
- *G06K 9/34* (2006.01)
- *G06K 9/40* (2006.01)
- *G06K 9/42* (2006.01)
- *G06K 9/44* (2006.01)
- *G06K 9/20* (2006.01)
- *G06K 9/36* (2006.01)

(52) U.S. Cl. ............... 382/173; 382/256; 382/266; 382/282

(58) Field of Classification Search ......... 382/173–180
See application file for complete search history.

(56) References Cited

U.S. PATENT DOCUMENTS

| | | | | |
|---|---|---|---|---|
| 6,728,314 | B2* | 4/2004 | Kan et al. | 375/240.12 |
| 2003/0099397 | A1* | 5/2003 | Matsugu et al. | 382/173 |
| 2004/0258305 | A1* | 12/2004 | Burnham et al. | 382/171 |

OTHER PUBLICATIONS

Lin et al, "Unseeded Region Growing for 3D Image Segmentation", Pan-Sydney Workshop on Visual Information Processing, Dec. 2000, Conferences in Research and Practice in Information Technology vol. 2.*

Reynolds et al, "Learning the Parameters for a Gradient-Based Approach to Image Segmentation From the Results of a Region Growing Approach Using Cultural Algorithms", Evolutionary Computation, 1995., IEEE International Conference vol. 2.*

Moga et. al., "an Efficient Watershed Segmentation Alogrithm Suitable For Parallel Implementation", IEEE 0-8186-7310-9/95, 1995.*

P.E. Danielsson, "Computer Graphics and Image Processing"—(chapter 14) Euclidean Distance Mapping, 1980, pp. 227-248.*

Stoev, Stanislav L., Extracting Regions of Interest Applying a Local Watershed Transformation, pp. 21-28.

Vincent, Luc, Watersheds in Digital Spaces: An Efficient Algorithm Based on Immersion Simulations, IEEE Transactions on Pattern Analysis and Machine Intelligence, vol. 1, No. 6, Jun. 1991, pp. 583-598.

* cited by examiner

*Primary Examiner*—Samir Ahmed
*Assistant Examiner*—Nathan Bloom
(74) *Attorney, Agent, or Firm*—Donald B. Paschburg; F. Chau & Associates, LLC

(57) ABSTRACT

We propose local watershed operators for the segmentation of structures, such as medical structures, from an image. A watershed transform is a technique for partitioning an image into many regions while substantially retaining edge information. The proposed watershed operators are a computationally efficient local implementation of watersheds, which can be used as an operator in other segmentation techniques, such as seeded region growing, region competition and markers-based watershed segmentation.

16 Claims, 5 Drawing Sheets

LOCAL WATERSHED OPERATORS FOR IMAGE SEGMENTATION

CROSS-REFERENCE TO RELATED APPLICATIONS

This application claims priority to U.S. Provisional Application No. 60/552,482, which was filed on Mar. 12, 2004, and which is fully incorporated herein by reference.

BACKGROUND OF THE INVENTION

1. Field of the Invention

The present invention relates generally to the field of medical imaging, and, more particularly, to using local watershed operators for the segmentation of medical structures.

2. Description of the Related Art

Recent technological advances in imaging acquisition devices significantly increase the spatial resolution of image data. For example, a new multi-detector computer tomography ("CT") machine can produce images with sizes as large as 512×512×1000. Segmentation algorithms for such large images typically need to operate locally to be computationally efficient because a limited amount of time and memory are available.

One method to segment large images is to use a user-defined region of interest. A "region of interest" refers to a selected portion of a two-dimensional ("2D") or three-dimensional ("3D") image. While cropping data via a user-defined region of interest may be a salutation for well-localized pathologies, the user-selected regions can still be very large in many applications (e.g., vascular segmentation or bone removal in a computer tomography angiography ("CTA")). In an alternate method, images can be thresholded to reduce the area in which the segmentation and visualization algorithms need to operate. When an image is "thresholded," areas of the image are discarded if the intensity of the areas falls outside a pre-defined (e.g., user-defined) value. However, the images are typically thresholded at the expense of removing anatomically important structures from the data.

In medical image analysis, for example, accurate detection of object boundaries is important for quantification reasons, making edge-based algorithms popular. While advances in edge detection algorithms have increased the accuracy and performance of edge detectors, such algorithms are still not robust enough for many practical applications because of the complexity of edge grouping and linking, especially in three dimensions. An exemplary practical application is the segmentation of medical images (e.g., segmentation of vascular structures or the pathologies on the vascular structures).

Unlike edge detection algorithms, watershed transforms produce closed contours and give good performance at junctions and places where the object boundaries are diffused. However, watershed transforms are typically designed for operating on a whole image or cropped image, making such algorithms very slow for large data sets.

SUMMARY OF THE INVENTION

In one aspect of the present invention, a method of segmenting an image is provided. The method includes determining a gradient of the image to form a gradient image; forming a first layer by obtaining a user-selected region of interest in the gradient image; forming a plurality of second layers immediately neighboring the first layer; forming a plurality of third layers immediately neighboring the plurality of second layers; merging the first layer with one of the plurality of second layers using a merging criteria to form a merged first layer; and performing a filling process starting from neighbors of the plurality of third layers.

In another aspect of the present invention, a machine-readable medium having instructions stored thereon for execution by a processor to perform method of segmenting an image is provided. The method includes determining a gradient of the image to form a gradient image; forming a first layer by obtaining a user-selected region of interest in the gradient image; forming a plurality of second layers immediately neighboring the first layer; forming a plurality of third layers immediately neighboring the plurality of second layers; merging the first layer with one of the plurality of second layers using a merging criteria to form a merged first layer; and performing a filling process starting from neighbors of the plurality of third layers.

In yet another aspect of the present invention, a system of segmenting an image is provided. The system includes means for determining a gradient of the image to form a gradient image; means for forming a first layer by obtaining a user-selected region of interest in the gradient image; means for forming a plurality of second layers immediately neighboring the first layer; means for forming a plurality of third layers immediately neighboring the plurality of second layers; means for merging the first layer with one of the plurality of second layers using a merging criteria to form a merged first layer; and means for performing a filling process starting from neighbors of the plurality of third layers.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
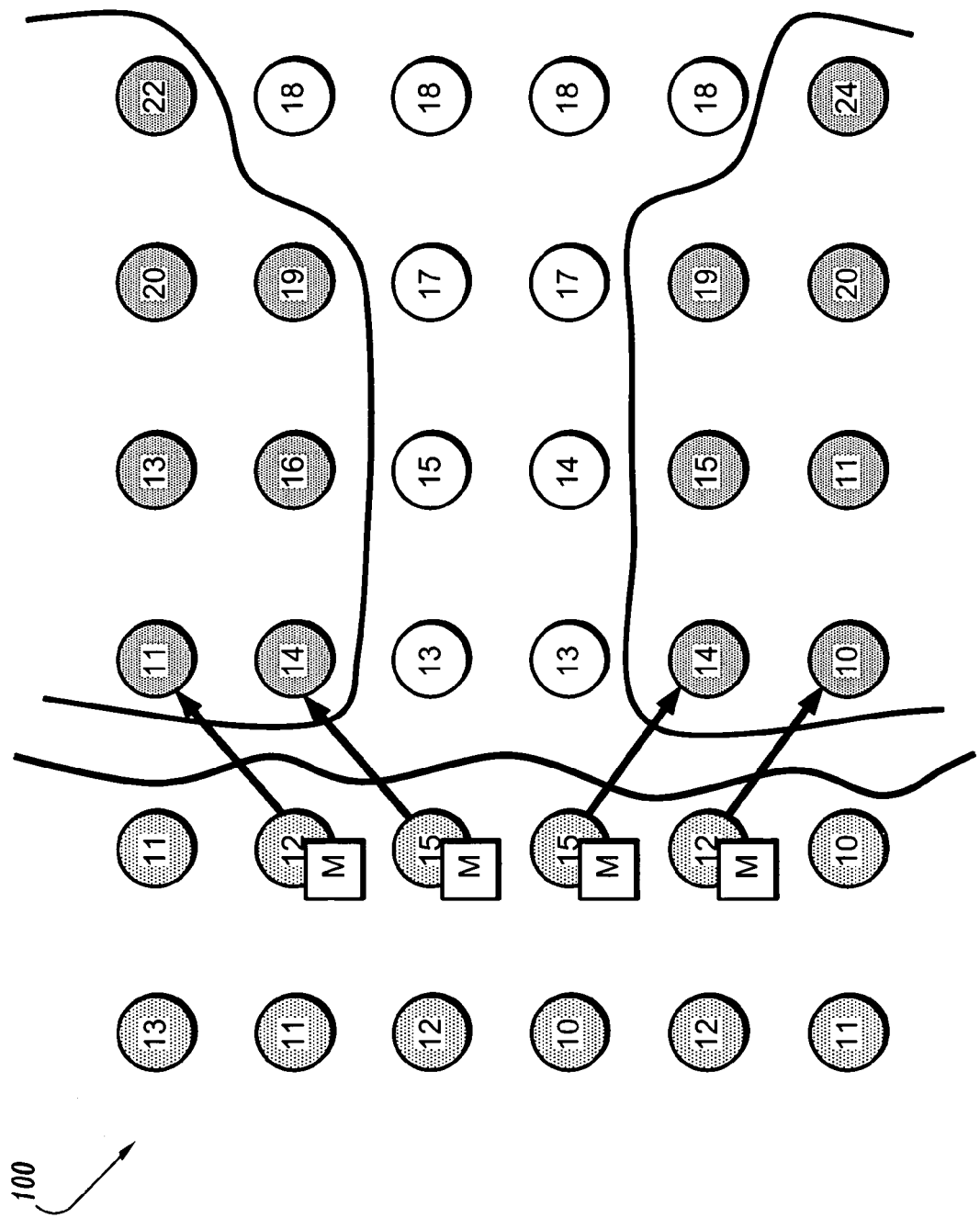
FIG. 1 depicts an exemplary illustrative representation of breadth-first basin filling.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We propose local watershed operators for the segmentation of structures, such as medical structures from an image. A watershed transform is a technique for partitioning an image into many regions while substantially retaining edge information. The proposed watershed operators are a computationally efficient local implementation of watersheds, which can be used as an operator in other segmentation techniques, such as seeded region growing, region competition and markers-based watershed segmentation. The term "watershed" refers to an area of an image that drains downslope to the lowest point.

Seeded region growing refers to an image segmentation technique, in which, starting from a seed, pixels with a value between a user-defined interval are collected to produce a segmentation result. Statistic are computed for each region, namely mean and standard deviation. Then, for each layer-zero region, its neighbors are determined. Then, the most similar region among them is determined. The most similar criteria can be the absolute difference between means or the result of the Fisher test, as contemplated by those skilled in the art. Then, we add this region to layer-zero. This addition process continues until the similarity criteria is higher than a user or automatically selected value.

In region competition, we consider that there are N markers, and thus N layer-zeroes. Statistics are computed for each region, namely mean and standard deviation. Then, for each layer-zero region, we determine its neighbors. Then, the most similar region among them is determined. The most similar criteria can be the absolute difference between means or Fisher exact test, as contemplated by those skilled in the art. Then, we have cost value for each layer-zero region. From these, we select the lowest layer-zero region, and determine the region identification and its marker. This region is added to the corresponding marker (layer-zero). This iterative algorithm continues until all regions are partitioned between markers.

In marker-based watershed segmentation, we suppose there are N markers initialized by the user. First, the neighbors (i.e., layer-one) regions of each layer-zero region are determined. Then, for each layer-zero, the lowest height value between a layer-zero and all its neighbors are determined. We call this lowest value, Vi, for the marker Mi. Then, we do this for each layer-zero (representing each marker). Then, we have N Vi. From these, we select the lowest Vi and determine the region identification and its marker. This region is added to the corresponding marker (layer-zero). This iterative method continues until all regions are partitioned between markers.

The proposed method is based on filling operations from a user-selected point. The term "filling" refers to collecting pixels together using region growing operators. Filling from the user-selected point forms the first inner layer. The immediate two outer layers of each region are represented and filled at the same time, resulting in an accurate filling of the regions. The first inner later and the two outer layers form a three-layer representation, which ensures that the user-selected region (i.e., a catchment basin) and its watershed lines are computed correctly and locally. It should be appreciated that the terms "layer," "region," "basin" and "catchment basin" are used interchangeably through this disclosure.

The proposed method can be used as an operator in segmentation algorithms. Specifically, instead of use a pixel-based growth found in many locally operating segmentation algorithms, regions can be used via the proposed local watershed operators. The incorporation of regions into the local segmentation algorithms allows a more accurate localization of object boundaries, especially when the boundaries are diffused. Localization refers to the exact computation of object boundaries.

Watershed segmentation is a morphological gradient-based technique, which can be intuitively described as follow:

(1) View a gradient image as a height map, and gradually immerse it in water, with the water leaking through the minimum gradient points and rising uniformly and globally across the image; and (2) Place a "dam" where two distinct bodies of water (i.e., catchment basins) meet and continue the process until water has reached all the points of the image.

The dams provide the final segmentation. The dams can be interpreted in the image domain as the growth of seeds placed on the minima of the image gradient height map at a time proportional to their height that finally converges on the crest lines of the gradient map. The term "minima" refers to a point, curve or flat surface which is not surrounded by pixel with a lower value (e.g., lower gradient) The term "maxima" refers to a point, curve or flat surface which is not surrounded by pixel with a higher value (e.g., higher gradient).

Watershed-based segmentation can be a popular approach, especially where local gradients cannot be defined (e.g., diffused edges). Because most structures contain several catchment basins, a typical watershed segmentation may produce a large number of regions for even simple images. This over-production is commonly known as the over-segmentation problem. Many regions can be effectively eliminated using nonlinear smoothing filtering. Other regions can be grouped using region-growing techniques or marker methods, as contemplated by those skilled in the art.

We propose a novel method for computing a watershed transform of an image locally. It is based primarily on filling a region from a user-selected point. A primary goal of the method is to fill a basin of the image and computer its boundaries correctly and locally. This goal is satisfied by a three-layer basin filling method, which fills the main region and a plurality of immediate neighboring regions simultaneously.

Before discussing the three-layer basin filling method, we first describe two other basin filling methods that do not provide optimum performance.

Breadth-First Basin Filling

The most obvious approach to basin extraction would be filling the basin with water and building dams on the ridges of the basin. The term "ridges" refers to curves (in 2D or 3D surfaces) that separate two neighboring regions. First, the minimum of a user-selected region is computationally determined with a gradient descent method. Then, the region is filled with water starting from the minimum. When the water level reaches the ridges (i.e., watershed lines), dams (i.e., maxima points) are constructed to stop the water from flowing into the neighboring regions. The term "neighboring region" refers to a region in the vicinity of a main region. When a region is surrounded by dams, the filling process terminates. Second, the minimum of a neighboring region is determined from the dams (i.e., maxima points) also using the gradient descent method. The same approach used for filling and constructing dams for the user-selected region is recursively applied to fill the neighboring basins. After the neighboring regions are filled, the neighboring regions are merged with the user-selected region if segmentation criteria are met. The segmentation criteria can come from, for example, the similarity of regions or an energy function that minimizes certain energy after the merge.

One exemplary embodiment of a breadth-first filling method is as follows. The filling process is implemented using region-growing type operators (i.e. pixels (or points) visit eight-neighborhood in 2D or 27-neighborhood in 3D and bucket-based queuing is used in implementing the region growing for computational efficiency). Queuing is necessary for simulating a water rise (i.e., filling a region from lower values to higher values). More specifically, we start from a minimum point of a region, visit its eight neighbors (in 2D or 27 neighbors in 3D), and put the neighbors (i.e., pixels or points) into buckets based on the height function (i.e., height value) of the neighbors. A bucket refers to storage (e.g., in software) that stores the pixels with some value. Then, the pixel with the minimum value is removed from the bucket for further growing. We check if any neighbor of this pixel has a lower intensity value. The intensity value here refers to the height value. The existence of a pixel with a lower intensity value means that a watershed line is in the vicinity. We mark that point as a maximum, and its neighbors are not inserted into buckets. This growth process continues until no more pixels are left in the buckets (i.e. the basin is filled and surrounded by maxima points).

Referring now to FIG. 1, an exemplary application 100 of the breadth-first filling method described herein is illustrated. As shown in the Figure, the breadth-first filling method prevents passing through narrow regions, necks or protrusions. That is, water cannot flow through narrow regions because of flooding on the dam, which is at the maxima, is stopped. Thus, basins cannot be correctly determined. The arrows show the pixels, which cause the maxima to stop. The numbers represent height values. The various shades in the FIG. 1 (as well as FIG. 4, described in greater detail below) represent separate regions. The label M represents maximas.

The problem described in FIG. 1 (i.e., the neck problem) may be solved by using differential operators, such as second order derivatives. However, such operators are sensitive to noise and filter sizes. Ideally, we want to have a robust basin filling method with no higher order gradient computations.

Depth-First Basin Filling

The breadth-first basin filling method described in greater detail above builds dams wherever it sees a lower height during the filling process. An alternate approach for computing a local watershed transform is to fill the neighboring regions whenever water flows into them instead of building dams. Specifically, when a pixel visits a neighboring pixel with a lower height value, the minimum of the neighboring region is computed and the water level is reduced to its minimum. The filling process continues from the new minimum until the user selected basin is filled.

Figure 2:
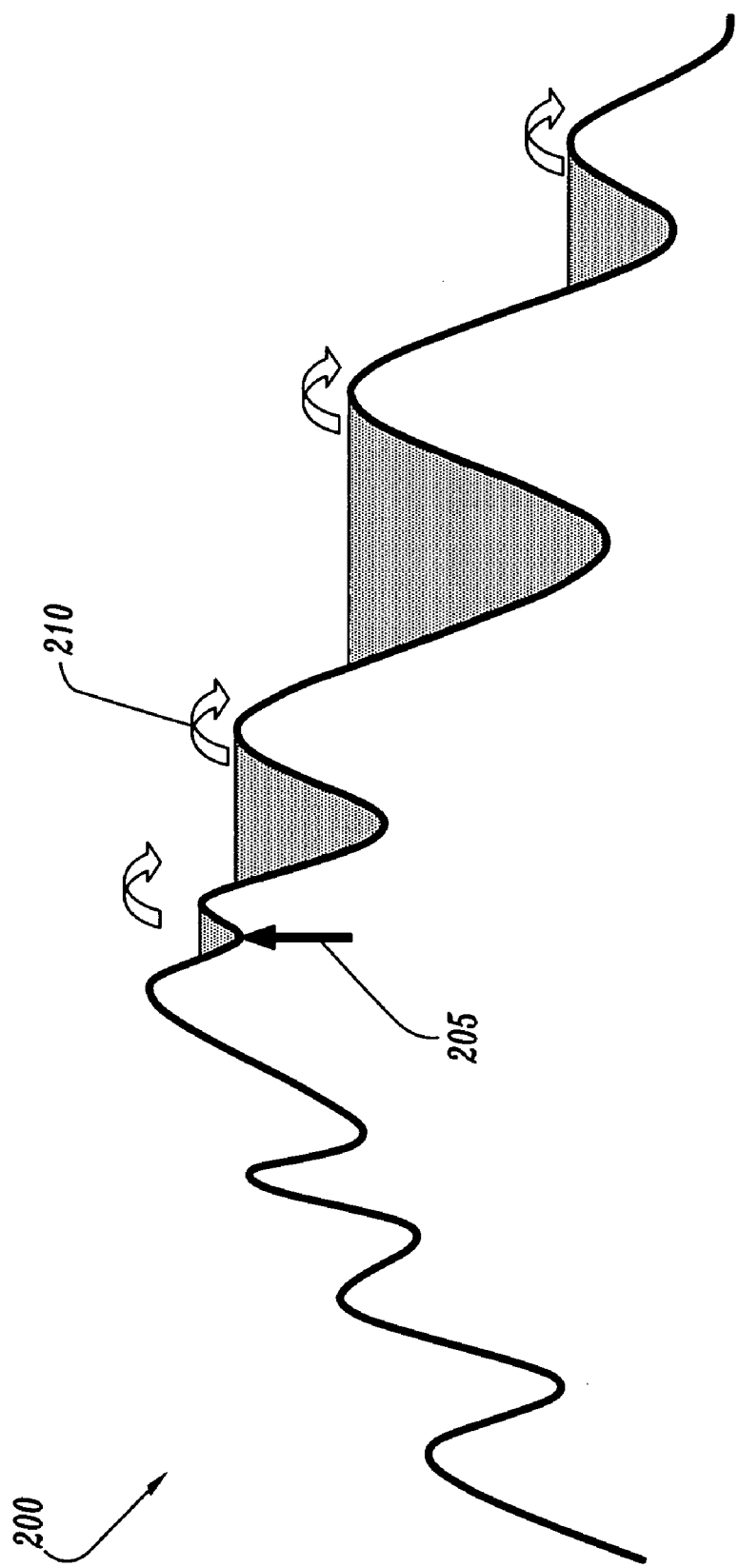
FIG. 2 depicts an exemplary illustrative representation of depth-first basin filling.

Referring now to FIG. 2, an exemplary application 200 of the depth-first basin filling described herein is illustrated. Whenever water reaches the dam, the water starts filling the neighboring region from its minimum. The same process is applied to all neighboring regions iteratively, resulting in the exploration of too many regions if the minima of neighboring regions are in monotonically decreasing order. The solid arrow 205 represents the starting point of the water flow. The curved arrow 210 in FIG. 2 (as well as FIG. 3, described in greater detail below) represents the directional flow of water.

In depth-first basin filling, the pixels where water from different basins are visited more than once are marked as "watershed-pixels," which are equidistant to two or more regions. This method works very well if the selected basin is surrounded by regions with higher minima. However, when a region neighbors several regions with lower minima, which in turn also neighbors other regions with lower minima, the depth-first basin filling method will fill a considerably large number of regions. Thus, the method is not ideal where the local growth process is extremely important.

Three-Layer Basin Filling

We now present a three-layer basin filling watershed method, which combines the breadth-first basin filling and depth-first basin filling approaches described in greater detail above. Referring now to FIG. 2, the user-selected region of interest is assigned to "layer-zero," and the immediate neighboring layers of the user-selected region are marked as "layer-one" and the immediate neighbors of layer-one regions are marked as "layer-two."

It is already shown by the traditional watershed algorithms that a basin and its watershed lines can be correctly computed if its neighboring regions are filled simultaneously (i.e., water reaches the ridges at the same time). It is enough to start or continue the filling process right before the lowest level ridge the two neighboring regions share. Then, the three-layer basin filling method simulates region competition between these two neighboring regions, and correctly constructs all watershed lines the two neighboring regions share. This property (i.e., the region competition property) is used in the three-layer basin filling method between layer-zero vs. layer-one regions and layer-one vs. layer-two regions. In other words, layer-zero and layer-one regions initialize the neighboring regions whenever layer-zero and layer-one reach to the first watershed line that they share with their neighbors, thus allowing simultaneous filling and correct determination of watershed lines between these layers. On the other hand, layer-two regions build dams wherever they detect new regions. Thus, it is possible that layer-two basins cannot be fully filled due to the neck problem. The "neck problem" refers to the concept that objects often are connected by small narrow region. The three-layer basin filling process stops when layer-zero and all layer-one regions are completely filled (i.e., all watershed lines have been formed).

Watershed methods typically apply special processes when water reaches a plateau (i.e., a local flat region). A plateau does not introduce any problems if it is completely inside a basin. However, when the plateau is located between two or more basins, extra care must be taken to partition the plateau between the regions correctly. A distance transform is used in the three-layer basin filling method to partition the plateaus between regions. Specifically, assume that a pixel Pi visits its neighboring pixel Pj. The distance value at Pj is defined as $$dist(P_j) = \begin{cases} 1 & \text{if } g(P_i) < g(P_j) \\ \min(dist(P_j), dist(P_i) + 1) & \text{else if } g(P_i) = g(P_j) \end{cases} \quad (1)$$

where g(P) is the height function at P. The above equation uses a simple distance metric. More accurate distance metrics, such as Euclidean can be used as well, as contemplated by those skilled in the art. However, doing so will generally be at the expense of more computational time.

Figure 4:
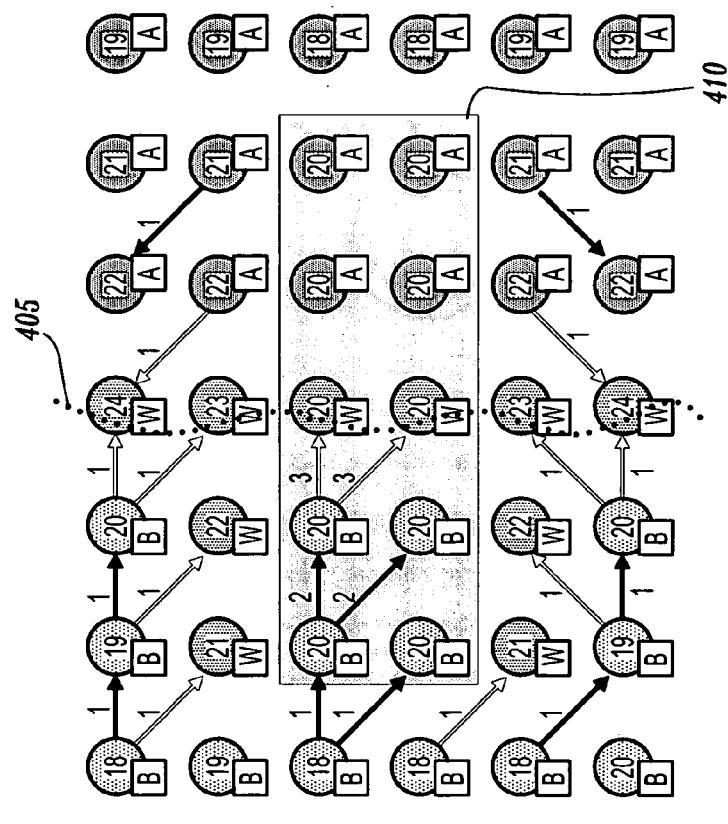
FIG. 4 depicts an exemplary representation of a partitioning of a plateau between two basins.
Figure 4:
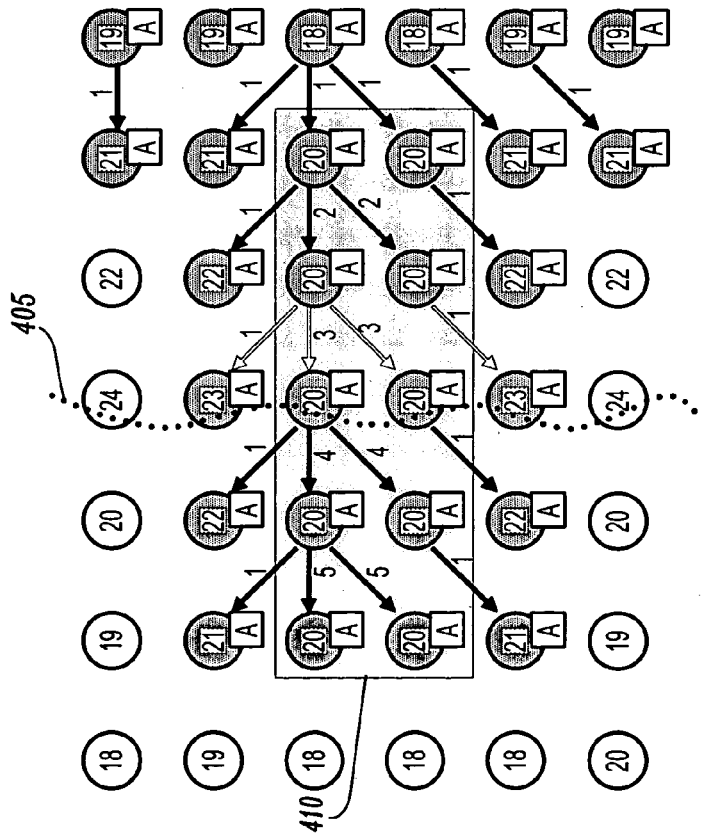

The distance transform in equation (1) allows the correct partitioning of plateaus between two regions. However, when a layer-zero or a layer-one initializes a region from a plateau, a special case occurs. Referring now to FIG. 4, two regions, region A and region B, are shown separated by a dashed line 405. Region A propagates on the plateau 410 (level 20) until it detects a new region B, (i.e., it sees an empty lower level (level 18)). During the propagation, all plateau points and pixels next to the plateau are marked as region A. When water is initialized from B, the water corrects the pixels at the plateau by using a distance transform. However, pixels next to the plateau are marked as watershed-pixels (W) because collision from regions A and B are marked at these pixels. Specifically, region B visits these pixels but region B cannot change the region labels of those pixels because it brings a distance value of one as region A does. This causes an error in the method, which is corrected when the pixels from watershed-pixels are selected from the bucket. Specifically, if the sources of the pixels are different, then they were correctly marked as watershed pixels. Otherwise the correct regional labels of those pixels are assigned to them and water starts rising from them. The arrow indicate the propagation of distance.

Figure 3:
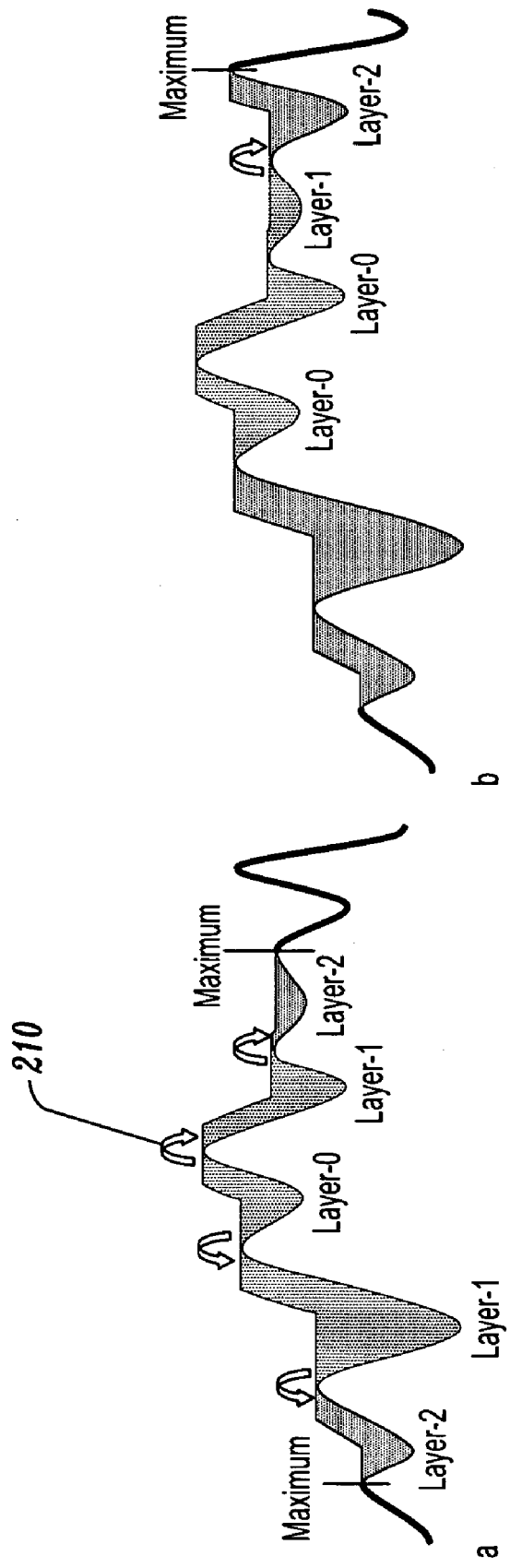
FIG. 3a depicts an exemplary illustrative three-layer representation of basins during flooding.
FIG. 3b depicts an update of the exemplary three-layer representation in FIG. 3a after merging and continued flooding.

Once the layer-zero and layer-one regions are filled correctly (i.e., no pixels exist in the buckets), the filling process terminates. Now, region merging can be applied between the layer-one basins and the layer-zero basin. When a layer-one region is merged to the layer-zero basin via some merging criterion (e.g. thresholding), the layer-one region is also marked as layer-zero and the regional information of layer-zero is updated accordingly, as shown in FIG. 3. FIG. 3a illustrates a three-layer representation of basis during flooding, and FIG. 3b illustrates the update of the layers after merging and continued flooding.

In addition, all the neighboring layer-two regions of the merged layer-one region are updated to layer-one status.

After merging, the filling process is restarted from the minimum point of the previous level-two regions' maxima list. This may cause some parts of layer-two regions to be processed again, but it is important to lower the water level to the place where the first maximum was marked. The lowering of water level to the first maximum point allows the algorithm to initialize the neighbors of the previous level-two regions(converted to layer-one after merging) as the new level-two regions, thus, avoiding the neck problem, as shown in FIG. 1. The filling process continues until there are no more pixels left in the buckets (i.e., all new layer-one regions are also filled). The triple-layer basin filling method continues by merging, updating and flooding until a user-defined convergence criterion or a combination of several criteria are satisfied, as contemplated by those skilled in the art. Layer-one regions are merged to the layer-zero regions during the growth process. This merge causes some updates to the other regions. Then the filling or flooding process is restarted.

Medical Image Segmentation Using Watershed Operators

We now proposed a new method for computing watershed transforms locally and correctly. This new method includes filling and merging processes. We call the filling and merging processes watershed operators. Similarly, a deletion operator can be easily defined. These watershed operators (i.e., addition and deletion) can be used as a basis for the segmentation processes. Addition is the combination of merge, update, and filling. Deletion is defined as removing a region from layer-zero and marking it as layer-one region.

We propose that regions can be used instead of pixels for growing/deleting operations. Specifically, we illustrate the ideas on seeded region growing and region competition methods.

Combined with morphological operations, seeded region growing can be considered as one of the most practical segmentation algorithms in medical image applications due to its simple implementation and near real-time execution. From a user-selected point, pixels are typically added to the growing region until a threshold criterion is no longer satisfied. This method works well if the regions are well isolated and a good threshold value (i.e., a user-defined value) is determined. However, region growing methods cannot localize edges, especially when boundaries are diffused.

Figure 5:
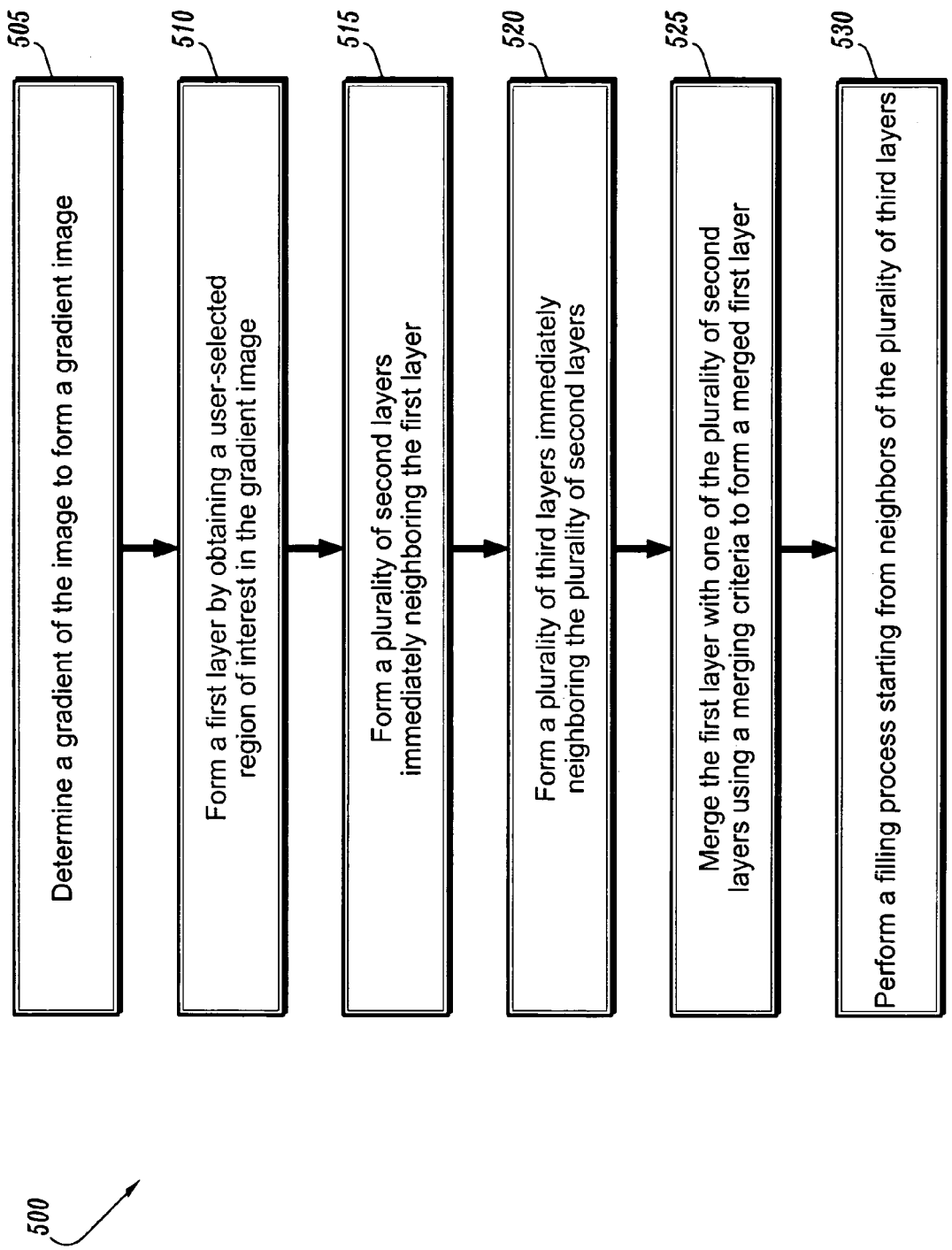
FIG. 5 depicts an exemplary flow diagram of a method of segmenting an image is illustrated, in accordance with one embodiment of the present invention

We propose that region growing be implemented using watershed operators. Instead of pixels, basins are added to the growing region. The threshold is determined from a bleeding criterion. Specifically, the bleeding criterion monitors the size of the growing region and the histogram of the segmented region. If a newly added basin changes the histogram and the number of pixels in the segmentation significantly, bleeding occurs and this stops the propagation. A primary advantage of this method is its ability to better localize edges even in the case of diffused edges. FIG. 5 presents the segmentation of vessels and parts of the kidney by this algorithm.

A second example of applying watershed operators for image segmentation is the region competition. Region competition generally works well. However, region competition cannot guarantee boundary detection at the edge point because of the difficulty of incorporating edge information. Further, region competition requires advanced deformable model evolution.

Referring now to FIG. 5, an exemplary method 500 of segmenting an image is illustrated, in accordance with one embodiment of the present invention. A gradient of the image is determined (at 505) to form a gradient image. A first layer is formed (at 510) by obtaining a user-selected region of interest in the gradient image. A plurality of second layers are formed (at 515) immediately neighboring the first layer. A plurality of third layers are formed (at 520) immediately neighboring the plurality of second layers. The first layer is merged (at 525) with one of the plurality of second layers using a merging criteria to form a merged first layer. A filling process is performed (at 530) starting from neighbors of the plurality of third layers.

The three-layer basin filling method described in greater detail above computes watershed transforms locally and accurately. Among other implementations, the three-layer basin filling method may be used in the semi-automatic segmentation of medical structures in large data sets (e.g., CTA data obtained from multi-detector CT machines). In addition, the watershed operators can be efficiently used in segmentation algorithms.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of segmenting an image, comprising:
   determining a gradient of the image to form a gradient image;
   forming a first layer by obtaining a user-selected region of interest in the gradient image;
   forming a plurality of second layers immediately neighboring the first layer;
   forming a plurality of third layers immediately neighboring the plurality of second layers;
   merging the first layer with one of the plurality of second layers using a merging criteria to form a merged first layer;
   performing a filling process starting from neighbors of the plurality of third layers; and
   partitioning a plateau located between at least two of the first layer, the second layer and the third layer, comprising: given a pixel $P_i$ visiting its neighboring pixel $P_j$, computing a distance value at $P_j$ $$dist(P_j) = \begin{cases} 1 & \text{if } g(P_i) < g(P_j) \\ \min(dist(P_j), dist(P_i)) + 1 & \text{else if } g(P_i) = g(P_j) \end{cases}$$

where $g(P)$ is a height function at P.

2. The method of claim 1, wherein determining a gradient of an image comprises applying a Sobel operator to the image to form the gradient image.

3. The method of claim 1, wherein forming a first layer comprises:
   adding a pixel to the first layer if the height value of the pixel to be added is higher than the height value of the first layer found in the gradient image; and
   initializing at least one of the plurality of second layers immediately neighboring the first layer, if the height value of the pixel to be added is lower than the height value of the first layer found in the gradient image.

4. The method of claim 1, wherein forming a plurality of second layers comprises:
   adding a pixel to one of the plurality of second layers, if the height value of the pixel to be added is higher than the height value of the one of the plurality of second layers found in the gradient image; and
   initializing one of the plurality of third layers immediately neighboring the one of the plurality of second layers if the height value of the pixel to be added is lower than the height value of the one of the plurality second layers found in the gradient image.

5. The method of claim 1, wherein forming a plurality of third layers comprises creating a dam on one of the plurality of third layers, if the height value of the one of the plurality of third layers is lower than the height value of one of the plurality of second layer, immediately neighboring the one of the plurality of third layers.

6. The method of claim 1, wherein merging the first layer with the plurality of second layers using a merging criteria comprises merging the first layer with one of the plurality of second layers using region composition.

7. The method of claim 6, wherein merging the first layer with one of the plurality of second layers using region composition comprises:
   computing a mean intensity value between the plurality of second layers;
   determining neighbors of each of the plurality of second layers;
   choosing one of the neighbors with the lowest mean intensity value; and
   adding the one of the neighbors to the first layer.

8. The method of claim 1, wherein merging the first layer with the plurality of second layers using a merging criteria comprises merging the first layer with one of the plurality of second layers using seeded region growing.

9. The method of claim 8, wherein merging the first layer with one of the plurality of second layers using seeded region growing, comprises:
   computing statistics of similarity between the plurality of second layers;
   determining neighbors of each of the plurality of second layers;
   choosing one of the neighbors with the highest similarity based on the statistics; and
   adding the one of the neighbors to the first layer.

10. The method of claim 9, wherein computing statistics of similarity between the plurality of second layers comprises computing a mean and standard deviation for each of the plurality of second layers.

11. The method of claim 9, wherein choosing one of the neighbors with the highest similarity based on the statistics comprises choosing one of the neighbors with the highest similarity based on an absolute difference between the means.

12. The method of claim 9, wherein choosing one of the neighbors with the highest similarity based on the statistics comprises choosing one of the neighbors with the highest similarity based on a Fisher exact test.

13. The method of claim 1, wherein merging the first layer with the plurality of second layers using a merging criteria comprises merging the first layer with one of the plurality of second layers using marker-based watershed segmentation.

14. The method of claim 13, wherein merging the first layer with one of the plurality of second layers using marker-based watershed segmentation, comprises:
   determining neighbors of each of the plurality of second layers;

determining a lowest height value, V, between each of the plurality of second layers and the corresponding neighbors of the each of the plurality of second layers; and adding one of the plurality of second layers with the lowest V to the first layer.

15. A machine-readable medium having instructions stored thereon for execution by a processor to perform method of segmenting an image, the method comprising:
determining a gradient of the image to form a gradient image; forming a first layer by obtaining a user-selected region of interest in the gradient image;
forming a plurality of second layers immediately neighboring the first layer;
forming a plurality of third layers immediately neighboring the plurality of second layers;
merging the first layer with one of the plurality of second layers using a merging criteria to form a merged first layer,
performing a filling process starting from neighbors of the plurality of third layers; and
partitioning a plateau located between at least two of the first layer, the second layer and the third layer, comprising; given a pixel $P_i$ visiting its neighboring pixel $P_j$, computing a distance value at $P_j$ $$dist(P_j) = \begin{cases} 1 & \text{if } g(P_i) < g(P_j) \\ \min(dist(P_j), dist(P_i) + 1 & \text{else if } g(P_i) = g(P_j) \end{cases}$$

where g(P) is a height function at P.

16. A system of segmenting an image, comprising:
means for determining a gradient of the image to form a gradient image;
means for forming a first layer by obtaining a user-selected region of interest in the gradient image;
means for forming a plurality of second layers immediately neighboring the first layer;
means for forming a plurality of third layers immediately neighboring the plurality of second layers;
means for merging the first layer with one of the plurality of second layers using a merging criteria to form a merged first layer;
means for performing a filling process starting from neighbors of the plurality of third layers; and
partitioning a plateau located between at least two of the first layer, the second layer and the third layer; and
wherein partitioning a plateau comprises: given a pixel Pi visiting its neighboring pixel Pj computing a distance value at Pj $$dist(P_j) = \begin{cases} 1 & \text{if } g(P_i) < g(P_j) \\ \min(dist(P_j), dist(P_i) + 1) & \text{else if } g(P_i) = g(P_J) \end{cases}$$

where g(P) is a height function at P.

* * * * *